(12) United States Patent
Klier et al.

(10) Patent No.: US 7,853,379 B2
(45) Date of Patent: Dec. 14, 2010

(54) METHOD AND CONTROL STRUCTURE FOR CONTROLLING A CONTROL ANGLE AND AN OUTPUT TORQUE OF A SUPERPOSITION ANGLE ACTUATOR

(75) Inventors: Willy Klier, Korb (DE); Reinhard Grossheim, Essingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 912 days.

(21) Appl. No.: 11/701,833

(22) Filed: Feb. 2, 2007

(65) Prior Publication Data

US 2007/0225884 A1    Sep. 27, 2007

(30) Foreign Application Priority Data

Feb. 2, 2006  (DE) ................ 10 2006 004 685

(51) Int. Cl.
B62D 5/04  (2006.01)
(52) U.S. Cl. ..................... 701/41; 180/443
(58) Field of Classification Search ............ None
See application file for complete search history.

(56) References Cited

U.S. PATENT DOCUMENTS

| | | | | |
|---|---|---|---|---|
| 5,205,371 A | * | 4/1993 | Karnopp | ............. 180/444 |
| 5,887,675 A | * | 3/1999 | Hackl et al. | ............. 180/422 |
| 6,226,579 B1 | * | 5/2001 | Hackl et al. | ............. 701/41 |
| 6,640,173 B1 | | 10/2003 | Zheng | |
| 6,640,923 B1 | | 11/2003 | Dominke et al. | |
| 7,574,294 B2 | * | 8/2009 | Ta et al. | ............. 701/41 |
| 2003/0150665 A1 | * | 8/2003 | Weeber et al. | ............. 180/421 |
| 2005/0251310 A1 | * | 11/2005 | Bohm | ............. 701/41 |

FOREIGN PATENT DOCUMENTS

| | | |
|---|---|---|
| DE | 197 51 125 | 9/1998 |
| DE | 100 32 340 | 1/2002 |
| DE | 10 2004 006 387 | 8/2004 |
| JP | 4-339009 | * 11/1992 |
| JP | 5-294173 | * 11/1993 |
| JP | 2006-143008 | * 6/2006 |
| WO | WO2004/106143 A1 | * 12/2004 |

* cited by examiner

Primary Examiner—Michael J. Zanelli
(74) Attorney, Agent, or Firm—Kenyon & Kenyon LLP

(57) ABSTRACT

A control method is for controlling a control angle and an output torque of a superposition angle actuator of a superimposed steering system of a motor vehicle. At least the control of the control angle occurs with the aid of a nonlinear compensation controller.

16 Claims, 3 Drawing Sheets

US 7,853,379 B2

METHOD AND CONTROL STRUCTURE FOR CONTROLLING A CONTROL ANGLE AND AN OUTPUT TORQUE OF A SUPERPOSITION ANGLE ACTUATOR

CROSS-REFERENCE TO RELATED APPLICATIONS

The present application claims priority to Application No. 10 2006 004 685.4, filed in the Federal Republic of Germany on Feb. 2, 2006, which is expressly incorporated herein in its entirety by reference thereto.

FIELD OF THE INVENTION

The present invention relates to a control method and a control structure for controlling a control angle and an output torque of a superposition angle actuator of a superimposed steering system of a motor vehicle. The present invention further relates to a computer program and to a computer program product having program code to implement the control method as well as to a superimposed steering system.

BACKGROUND INFORMATION

A method for operating a steering system is described, for example, in German Published Patent Application No. 197 51 125. In this instance, the steering motions applied by the driver through a steering wheel, the steering wheel angle, are superposed with the aid of a superposition gear with the motions of an actuating drive or superposition angle actuator to the motor angle or control angle. The superposed motion thus obtained is transmitted via the steering gear or steering linkage to the steerably designed wheels for setting the steering angle. For this purpose, the actuating drive takes the form of an electric motor. The functional principle or the practical applications of such a servo-steering system are, e.g., that the steering can be implemented indirectly through the transformation of the superposition gear and thus low steering wheel torques can be achieved. Very large steering wheel angles, which would result from this, are avoided by superposing suitable control angles such that steering wheel angles of the usual magnitude can be used to set required output angles. The control angle required for steering assistance or its setpoint value is determined from the steering wheel angle. Furthermore, the control angle may also be a function of signals which represent vehicle movements detected by sensors and/or other vehicle systems such as, for example, an electronic stability program (ESP). This is done by a control unit in which the programs required for determining the required motor control angles or for controlling the practical applications are executed.

The control of the control angle and of the output torque of the superposition angle actuator or electric motor of such a superimposed steering system of a motor vehicle normally occurs with the aid of a follow-up control of the position of the control angle and a current control of the output torque as cascade controller.

The following properties of the superimposed steering system are to be considered in the control:
dynamics, i.e., dynamic start-up behavior and response to setpoint changes of the steering;
haptics, i.e., the roughness or waviness of the steering torque (the so-called "ripple");
acoustics; and
robustness of the superposition angle actuator, i.e., sensitivity with respect to changes of mechanical properties such as static friction or viscous damping as well as environmental influences such as temperature, production inaccuracies and tolerances.

SUMMARY

Example embodiments of the present invention provide a control method and a control structure, which may improve a superimposed steering system or a superposition angle actuator with respect to the properties dynamics, haptics, acoustics and/or robustness.

Example embodiments of the present invention provide a control method for controlling a control angle and an output torque of a superposition angle actuator of a superimposed steering system of a motor vehicle in which at least the control angle is controlled by a nonlinear compensation controller.

The use of a nonlinear compensation controller may result in a clear improvement of the start-up behavior and/or response to setpoint changes of the superposition angle actuator. Additionally, a direct and mathematical-physical specification of the actuator dynamics is also made possible, e.g., it is possible to influence the haptics and acoustics directly. Variances of the properties of the controlled system (e.g., friction, etc.) may already be taken into account when designing the controller, which may markedly increase the stability or robustness of the superposition angle actuator in use. At the same time, an arrangement of the controller according to conventional and recognized methods of control engineering implies a proof of stability and the quality of the controller.

There may be a further provision for the output torque to be controlled by a nonlinear compensation controller.

This may allow for the nonlinear compensation controller to control the control angle as well as the output torque of the superposition angle actuator.

The following may be used as nonlinear compensation controllers:
computed-torque controllers;
compensation controllers on the basis of an exact linearization; and
sliding-mode controllers.

Such compensation controllers or controller concepts are described in more detail for example in "Klier, W., Theoretische Modellbildung, Rechnersimulation und Regelung räumlicher servopneumatischer Parallelroboter (Theoretical modeling, computer simulation and control of spatial servo-pneumatic parallel robots), dissertation, Kassel University, Department of Machine Construction, Field of Control Engineering, Shaker Verlag, 2002."

In addition, a discontinuous controller may be used for compensating system uncertainties.

At least one differentiating prefilter or state variable filter may be used.

A model-based estimate of the resulting gear rack force may be performed. An implementation of this estimation method is described for example in "Pnini, B., Steering Rack Forces Model for Active Steering Systems, diploma thesis, Department of Machine and Vehicle Systems, Chalmers University of Technology, Sweden, 2004."

A pole specification of at least two, e.g., three, pole positions may also be provided.

The control method according to example embodiments of the present invention for controlling the control angle and the output torque of a superposition angle actuator of a superimposed steering system of a motor vehicle may be implemented as a computer program in the control unit of the superimposed steering system. For this purpose, the computer program is stored in a memory element of the control unit. The method is implemented by execution in a microprocessor of the control unit. The computer program may be stored on a computer-readable storage medium (e.g., diskette, CD, DVD, hard disk, USB memory stick, etc.) or an internet server as a computer program product and may be transmitted from there to the memory element of the control unit.

According to an example embodiment of the present invention, a method includes: controlling a control angle and an output torque of a superposition angle actuator of a superimposed steering system of a motor vehicle. At least the controlling of the control angle is performed by a nonlinear compensation controller.

The superposition angle actuator may include an electric motor.

The controlling of the output torque may be performed by a current control of the electric motor.

The current control of the electric motor may be field-oriented.

The controlling of the output torque may be performed with a nonlinear compensation controller.

The nonlinear compensation controller may include a computed-torque controller.

The non-linear compensation controller may be based on an exact linearization.

The nonlinear compensation controller may include a sliding-mode controller.

The method may include compensating for system uncertainties with a discontinuous controller.

The controlling may be performed with at least one differentiating prefilter.

The method may include performing a model-based estimate of a resulting gear rack force of the superimposed steering system.

The method may include performing a pole specification of at least two pole positions.

According to an example embodiment of the present invention, a device includes a control structure adapted to control a control angle and an output torque of a superposition angle actuator of a superimposed steering system of a motor vehicle, the control structure including a nonlinear compensation controller adapted to at least control the control angle.

The nonlinear compensation controller may be adapted to control the output torque.

The device may include an arrangement adapted to perform a method including controlling the control angle and the output torque of the superposition angle actuator of the superimposed steering system of a motor vehicle. At least the controlling of the control angle is performed by the nonlinear compensation controller.

According to an example embodiment of the present invention, a computer-readable medium has stored thereon instructions adapted to be executed by a processor, the instructions which, when executed, cause the processor to perform a control method for controlling a control angle and an output torque of a superposition angle actuator of a superimposed steering system of a motor vehicle, at least the controlling of the control angle being performed by a nonlinear compensation controller.

According to an example embodiment of the present invention, a superimposed steering system of a motor vehicle includes: a steering handle adapted to specify a steering wheel angle as a measure for a desired steering angle for at least one steerable wheel of the motor vehicle; a steering gear adapted to convert the steering wheel angle into the desired steering angle of the at least one steerable wheel of the motor vehicle; a superposition device adapted to produce a steering angle by a superposition angle actuator and to produce an input angle of the steering gear from a superposition of the steering wheel angle with the control angle; and a control structure adapted to control the control angle and an output torque of the superposition angle actuator, the control structure including a nonlinear compensation controller adapted to at least control the control angle, control structure adapted to control the superposition angle actuator.

Further aspects and features of example embodiments of the present invention are described in more detail below with reference to the appended Figures.

DETAILED DESCRIPTION

Figure 1:
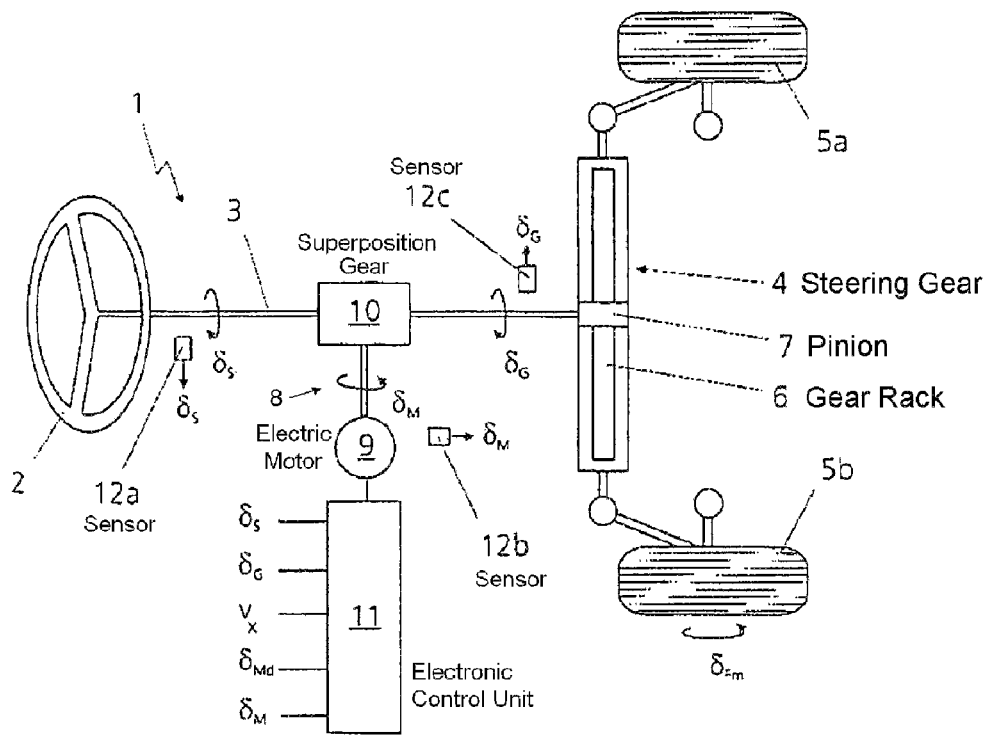
FIG. 1 is a schematic representation of a superimposed steering system.

FIG. 1 illustrates a superimposed steering system 1 of a motor vehicle. Superimposed steering system 1 has a steering handle in the form of a steering wheel 2. Steering wheel 2 is connected to a steering gear 4 by an articulated shaft 3. Steering gear 4 is used to convert a rotational angle of articulated shaft 3 into a steering angle $\delta_{Fm}$ of steerable wheels 5a, 5b of the motor vehicle. Steering gear 4 has a gear rack 6 and a pinion 7, which is engaged by articulated shaft 3. Superimposed steering system 1 moreover includes superposition device 8, which includes an actuating drive or superposition angle actuator in the form of an electric motor 9 and a superposition gear 10 driven by it. The superposition gear takes the form of a planetary gear 10. Steering wheel 2 is used to specify a steering wheel angle $\delta_S$ as the measure for a desired steering angle $\delta_{Fm}$ of steerable wheels 5a, 5b of the motor vehicle. A superposition angle $\delta_M$ is generated with the aid of electric motor 9 and is superposed by superposition gear 10 with steering wheel angle $\delta_S$. Control angle $\delta_M$ is produced to improve the driving dynamics of the motor vehicle or the comfort. The sum of steering wheel angle $\delta_S$ and control angle $\delta_M$ yields the input angle of steering gear 4 or the pinion angle $\delta_G$.

Downstream of superposition device 8, superimposed steering system 1 may additionally have a servo-drive used, e.g., for variable torque assistance.

Superimposed steering system 1 has an electronic control unit 11, which is used, among other things, also for controlling control angle $\delta_M$ and the output torque of electric motor 9. For this purpose, a control method is executed on electronic control unit 11, which is executed as a control structure or as a computer program on a microprocessor of control unit 11. Electric motor 9 is triggered by an electrical trigger signal $\delta_{Md}$, which corresponds to the setpoint value of the control angle $\delta_M$ superposed to electric motor 9. The triggering or control of electric motor 9 may occur as a function of vehicle speed $v_x$ of the motor vehicle, e.g., the transmission ratio between steering wheel angle $\delta_S$ and pinion angle $\delta_G$ or steering angle $\delta_{Fm}$ of wheels 5a, 5b is set by the superposition of steering angle $\delta_S$ with various, speed-dependent control angles $\delta_M$ as a function of vehicle speed $v_x$. This makes it possible, for example, to specify at low vehicle speeds $v_x$ a relatively small transmission ratio, at which a relatively small turn of steering wheel 2 results in a relatively large steering angle $\delta_{Fm}$ of wheels 5a, 5b. At a high vehicle speed $v_x$, it is possible for stability reasons to specify a relatively large transmission ratio. This dependency on vehicle speed $v_x$, however, is optional.

So that the open-loop or closed-loop control functions indicated above may be implemented, control unit 11 receives the current vehicle speed $v_x$ (e.g., via the CAN bus of the motor vehicle) as an input signal. In addition, superimposed steering system 1 has sensors 12a, 12b, 12c, which measure steering wheel angle $\delta_S$, control angle $\delta_M$ and pinion angle $\delta_G$ or supply signals from which these angles may be determined. As indicated in FIG. 1, control unit 11 is supplied via sensors 12a, 12b, 12c and other vehicle systems with, among other things, the input signals steering wheel angle $\delta_S$, pinion angle $\delta_G$, control angle $\delta_M$ and the setpoint value of control angle $\delta_{Md}$ (e.g., as specification from other driving dynamics systems). Alternatively or additionally, several of these variables may also be computed on the basis of the other or additional input variables (e.g., wheels speeds, etc.), e.g., with the aid of suitable models.

Figure 2:
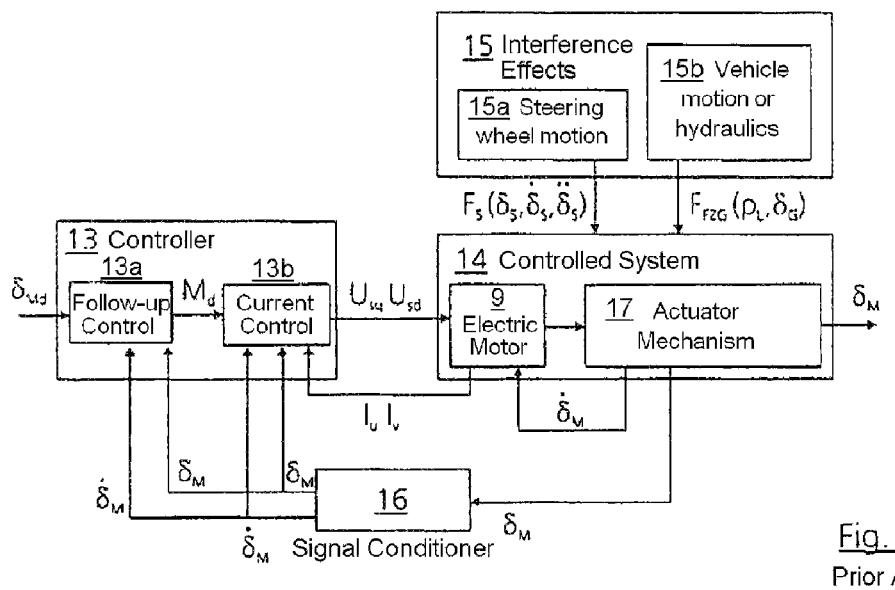
FIG. 2 is a schematic block diagram of a control structure for a superimposed steering system such as that illustrated in FIG. 1.

FIG. 2 is a block diagram of a conventional control loop or a control structure for controlling the control angle $\delta_M$ and an output torque of electric motor 9 of superimposed steering system 1. For this purpose, the control loop has a controller 13 in the form of a cascade controller, a system 14 to be controlled, interference effects 15 and a signal conditioner 16. Controller 13 has a follow-up control 13a for the control angle and a control of the output torque of electric motor 9 in the form of a current control 13b. Follow-up control 13a receives the setpoint control angle $\delta_{Md}$, the currently measured or ascertained control angle $\delta_M$ and the currently measured or ascertained control angle speed $\dot\delta_M$ as input and supplies a desired setpoint torque $M_d$ to current control 13b, which receives as input current control angle $\delta_M$ and its speed $\dot\delta_M$ as well as phase currents $I_u$, $I_v$ of electric motor 9. Current control 13b or controller 13 supplies voltages $U_{sq}$, $U_{sd}$ as trigger signals to electric motor 9 or controlled system 14. Controlled system 14 furthermore has actuator mechanism 17, which ultimately produces control angle $\delta_M$ and returns to electric motor 9 the detected current speed of control angle $\dot\delta_M$ as well as to signal conditioner 16 measured current control angle $\delta_M$. Interference effects 15 include a steering wheel motion 15a and a vehicle motion or hydraulics 15b, which act on controlled system 14 with a reaction force of steering wheel motion $F_S$, which is a function of steering wheel angle $\delta_S$ or of its speed $\dot\delta_M$ or of its acceleration $\ddot\delta_S$, or a force $F_{FZG}$ of vehicle motion via gear rack 6, which is a function of pressure difference $p_L$ between the right and left hydraulic chambers or the pinion angle $\delta_G$.

Below, control structures 13', 13" 13''', which replace controller 13 illustrated FIG. 2, are described with reference to FIGS. 3, 4 and 5. Control structures 13', 13", 13''' are suitable for implementing the control method hereof and represent simplified block diagrams of the control method.

Figure 3:
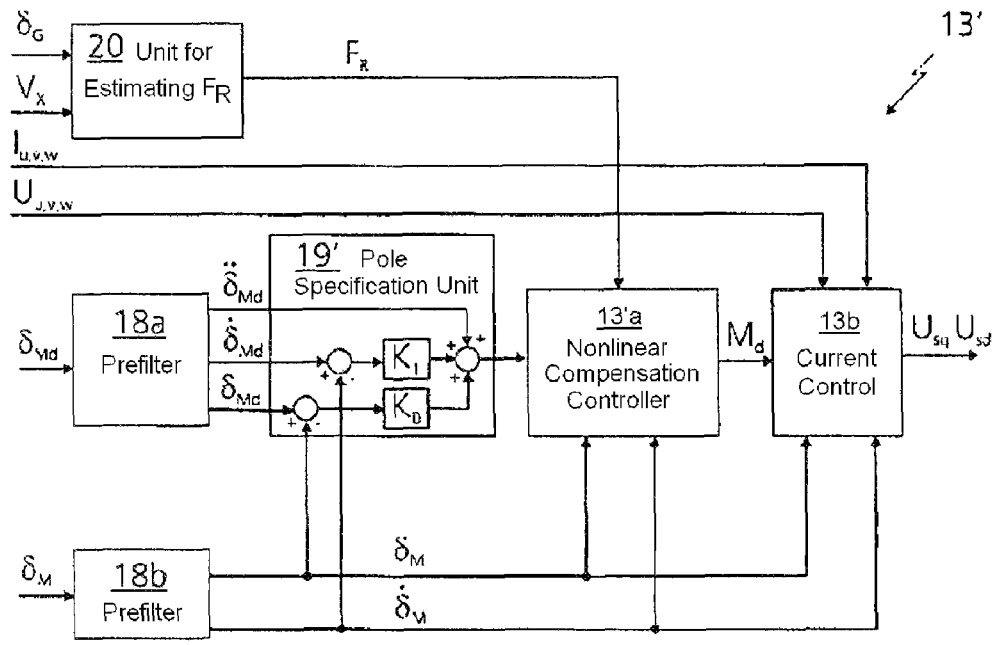
FIG. 3 is a schematic block diagram of a control structure according to an example embodiment of the present invention.

Control structure 13' as illustrated in FIG. 3 has a nonlinear compensation controller 13'a in the form of a computed-torque controller, which supplies a desired setpoint torque $M_d$ of electric motor 9 to provided current control 13b illustrated in FIG. 2. Furthermore, differentiating prefilters 18a and 18b are provided, which ascertain from the desired setpoint control angle $\delta_{Md}$ or the currently measured control angle $\delta_M$ in each case the corresponding speeds $\dot\delta_M$, $\dot\delta_{Md}$ and an acceleration $\ddot\delta_{Md}$ and supply these to a pole specification unit 19, to compensation controller 13'a and to current control 13b of the torque. Pole specification unit 19 ascertains two pole positions for nonlinear compensation controller 13'a, which only takes into account actuator mechanics 17. For this purpose, controller coefficients $K_0$, $K_1$ are specified. Current control 13b occurs in a field-oriented manner. In addition, in a unit 20, a model-based estimate of the resulting gear rack force $F_R$ is performed, which is supplied to nonlinear compensation controller 13'a as input. Phase currents $I_{u,v,w}$ and phase voltages $U_{u,v,w}$ are supplied to current control 13b. As output signal, control structure 13' supplies voltages $U_{sq}$, $U_{sd}$ as trigger signals for electric motor 9 (corresponding to FIG. 2).

Figure 4:
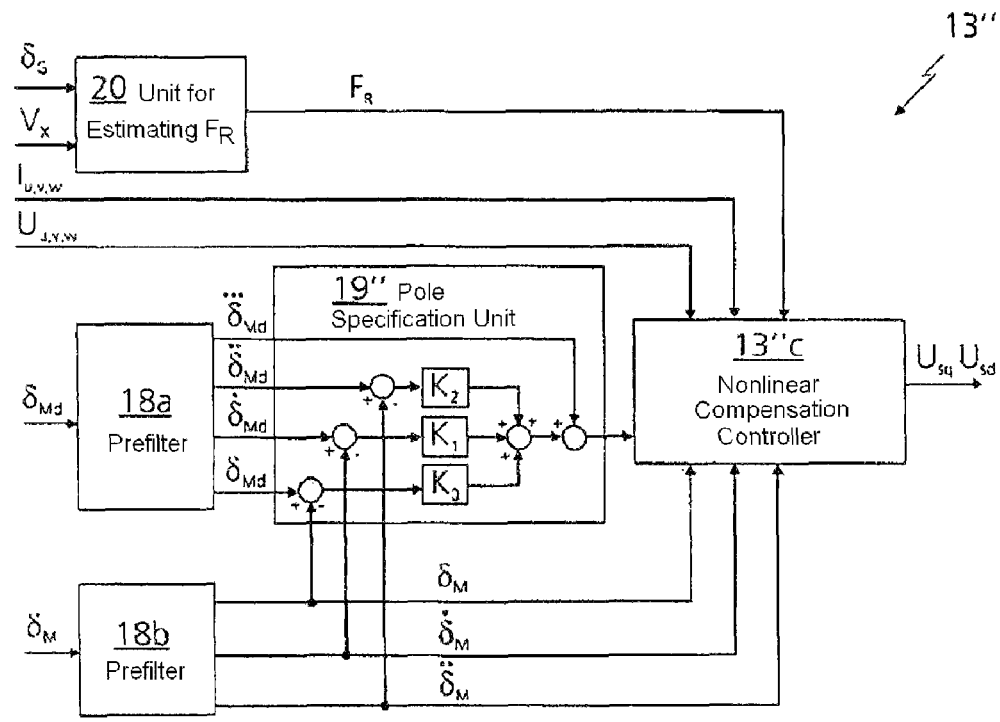
FIG. 4 is a schematic block diagram of a control structure according to an example embodiment of the present invention.

FIG. 4 illustrates a control structure 13", both the control of control angle $\delta_M$ as well as the control of the output torque of electric motor 9 occurring with the aid of a nonlinear compensation controller 13"c, which takes into account the mechanical and the electronic system dynamics and is based on a non-exact linearization. Furthermore, pole specification unit 19" specifies three pole positions with the aid of controller coefficients $K_0$, $K_1$, $K_2$. Control structure 13" thus includes an inverse model of the entire superposition angle actuator or electric motor 9.

Figure 5:
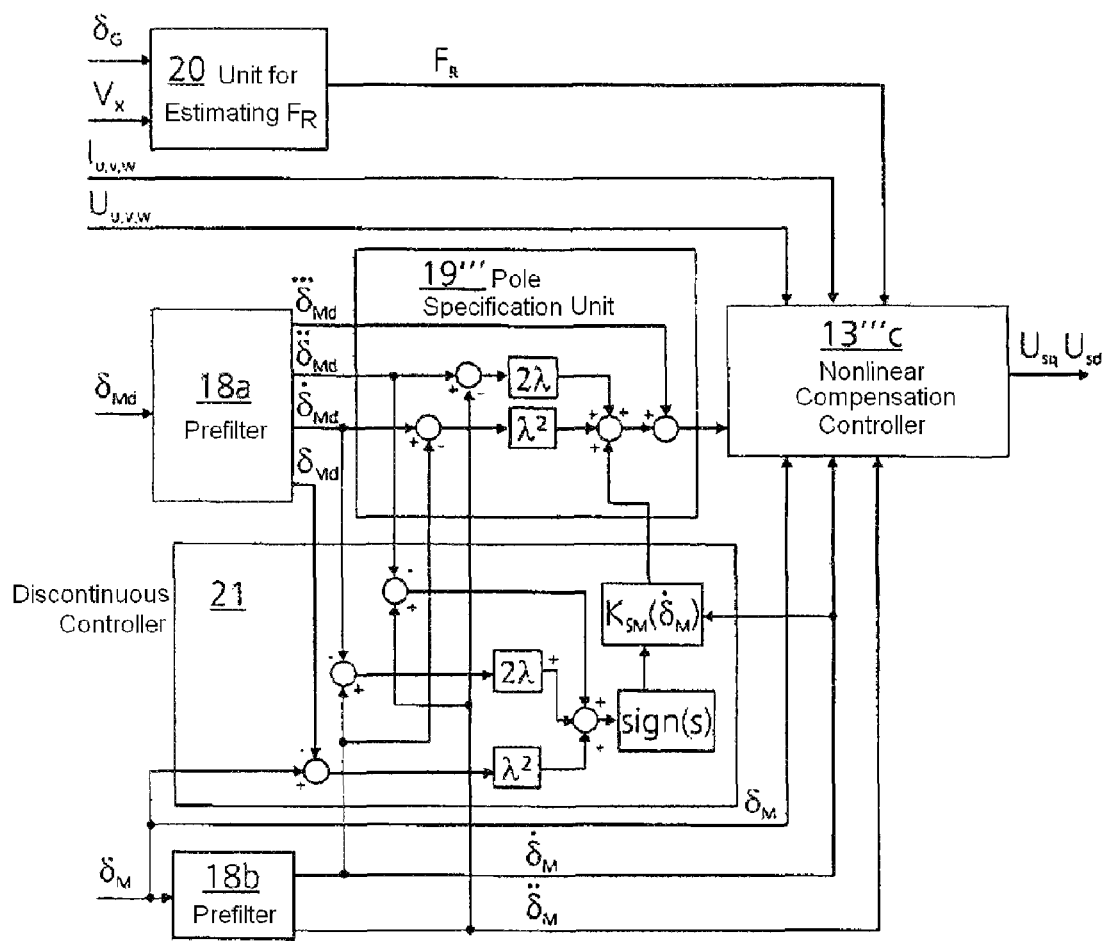
FIG. 5 is a schematic block diagram of a control structure according to an example embodiment of the present invention.

FIG. 5 illustrates a control method or a control structure 13'''. In this instance, a nonlinear compensation controller 13'''c is provided, which takes into account an inverse model of entire electric motor 9 or of entire controlled system 14, e.g., both the mechanical as well as the electronic system dynamics. Nonlinear compensation controller 13'''c takes the form of a sliding-mode controller. In addition, a discontinuous controller 21 is provided for compensating system uncertainties. This additional discontinuous controller 21 is superordinate and provides, despite inaccuracies and possibly false parameters, that the system as a whole continues to remain stable. Depending on the sign(s) of the error in a deviation, a corresponding correction is performed. For this purpose, a controller coefficient $K_{SM}(\delta_M)$ and a coefficient $\lambda$ is provided for model uncertainties. Such compensation controllers 13'a, 13"c, 13'''c, the determination of the corresponding controller coefficients $K_0$, $K_1$, $K_2$, $K_{SM}$ and the determination of the coefficient $\lambda$ for model uncertainties are described in more detail in, e.g., "Klier, W., Theoretische Modellbildung, Rechnersimulation und Regelung räumlicher servopneumatischer Parallelroboter (Theoretical modelling, computer simulation and control of spatial servo-pneumatic parallel robots), dissertation, Kassel University, Department of Machine Construction, Field of Control Engineering, Shaker Verlag, 2002."

REFERENCE CHARACTERS 1 superimposed steering system
2 steering wheel
3 articulated shaft
4 steering gear
5a, 5b steerable wheels
6 gear rack
7 pinion
8 superposition device
9 superposition actuator, electric motor
10 planetary gear
11 electronic control unit
12a, 12b, 12c sensors
13, 13', 13", 13''' control structures
13a, b controls
13'a, 13"c, 13'''c nonlinear compensation controllers 14 controlled system
15 interference effects
16 signal conditioner
17 actuator mechanism
18a, 18b differentiating prefilter
19, 19', 19" pole specification unit
20 unit for estimating $F_R$
21 discontinuous controller for compensating system uncertainties
$\delta_{Fm}$ angle of the steerable wheels
$\delta_G$ pinion angle
$\delta_M$ control angle
$\delta_{Md}$ setpoint torque
$\delta_S$ steering wheel angle
$p_L$ pressure difference
$v_x$ vehicle speed
$I_{u, v, w}$ phase currents
$U_{u, v, w}$ phase voltage
$\lambda$ coefficient concerning model uncertainties
$K_0, K_1, K_2, K_{SM}$ controller coefficients

What is claimed is:

1. A method, comprising:
controlling nonlinearly a control angle of a superposition angle actuator of a superimposed steering system of a motor vehicle;
controlling an output torque of the superposition angle actuator of the superimposed steering system of the motor vehicle;
wherein at least the controlling of the control angle is performed by a nonlinear compensation controller.

2. The method according to claim 1, wherein the superposition angle actuator includes an electric motor.

3. The method according to claim 2, wherein the controlling of the output torque is performed by a current control of the electric motor.

4. The method according to claim 3, wherein the current control of the electric motor is field-oriented.

5. The method according to claim 1, wherein the controlling of the output torque is performed with a nonlinear compensation controller.

6. The method according to claim 1, wherein the nonlinear compensation controller includes a computed-torque controller.

7. The method according to claim 1, wherein the non-linear compensation controller is based on an exact linearization.

8. The method according to claim 1, wherein the nonlinear compensation controller includes a sliding-mode controller.

9. The method according to claim 1, wherein the controlling is performed with at least one differentiating prefilter.

10. A method, comprising:
controlling a control angle and an output torque of a superposition angle actuator of a superimposed steering system of a motor vehicle;
compensating for system uncertainties with a discontinuous controller;
wherein at least the controlling of the control angle is performed by a nonlinear compensation controller;
wherein the nonlinear compensation controller includes a sliding-mode controller.

11. A method, comprising:
controlling a control angle and an output torque of a superposition angle actuator of a superimposed steering system of a motor vehicle;
performing a model-based estimate of a resulting gear rack force of the superimposed steering system;
wherein at least the controlling of the control angle is performed by a nonlinear compensation controller.

12. A method, comprising:
controlling a control angle and an output torque of a superposition angle actuator of a superimposed steering system of a motor vehicle;
performing a pole specification of at least two pole positions;
wherein at least the controlling of the control angle is performed by a nonlinear compensation controller.

13. A device, comprising:
a control structure adapted to control a control angle and an output torque of a superposition angle actuator of a superimposed steering system of a motor vehicle, the control structure including a nonlinear compensation controller adapted to at least control the control angle.

14. The device according to claim 13, wherein the nonlinear compensation controller is adapted to control the output torque.

15. A computer-readable medium having stored thereon instructions adapted to be executed by a processor, the instructions which, when executed, cause the processor to perform a control method for controlling nonlinearly a control angle of a superposition angle actuator of a superimposed steering system of a motor vehicle, and controlling an output torque of the superposition angle actuator of the superimposed steering system of the motor vehicle, at least the controlling of the control angle being performed by a nonlinear compensation controller.

16. A superimposed steering system of a motor vehicle, comprising:
a steering handle adapted to specify a steering wheel angle as a measure for a desired steering angle for at least one steerable wheel of the motor vehicle;
a steering gear adapted to convert the steering wheel angle into the desired steering angle of the at least one steerable wheel of the motor vehicle;
a superposition device adapted to produce a steering angle by a superposition angle actuator and to produce an input angle of the steering gear from a superposition of the steering wheel angle with a control angle; and
a control structure adapted to control the control angle and an output torque of the superposition angle actuator, the control structure including a nonlinear compensation controller adapted to at least control the control angle, the control structure adapted to control the superposition angle actuator.

* * * * *